(12) United States Patent
Liu et al.

(10) Patent No.: US 11,609,642 B2
(45) Date of Patent: *Mar. 21, 2023

(54) OPTICAL SENSOR APPARATUS AND METHOD CAPABLE OF ACCURATELY DETERMINING MOTION/ROTATION OF OBJECT HAVING LONG SHAPE AND/OR FLEXIBLE FORM

(71) Applicant: PixArt Imaging Inc., Hsin-Chu (TW)

(72) Inventors: Feng-Chi Liu, Hsin-Chu (TW); Ching-Lin Chung, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/862,420

(22) Filed: Jul. 12, 2022

(65) Prior Publication Data

US 2022/0342490 A1 Oct. 27, 2022

Related U.S. Application Data

(63) Continuation of application No. 17/213,247, filed on Mar. 26, 2021, now Pat. No. 11,429,199, which is a
(Continued)

(30) Foreign Application Priority Data

Dec. 14, 2015 (TW) .................................. 104141848

(51) Int. Cl.
*G06F 3/03* (2006.01)
*G06F 3/0362* (2013.01)
*G06F 3/02* (2006.01)
*G06F 3/0354* (2013.01)
*G04C 3/00* (2006.01)
*G04G 21/00* (2010.01)
(Continued)

(52) U.S. Cl.
CPC ............ *G06F 3/0304* (2013.01); *E05B 37/00* (2013.01); *G04C 3/005* (2013.01); *G04G 21/00* (2013.01); *G06F 1/163* (2013.01); *G06F 3/02* (2013.01); *G06F 3/0312* (2013.01); *G06F 3/0362* (2013.01); *G06F 3/03543* (2013.01)

(58) Field of Classification Search
CPC ........ G06F 3/0304; G06F 3/0312; G06F 3/02; G06F 3/03543; G06F 3/0362; G06F 1/163; E05B 37/00; G04C 3/005; G04G 21/00
See application file for complete search history.

(56) References Cited

U.S. PATENT DOCUMENTS 9,971,305 B2* 5/2018 Ely ...................... G04B 27/002
10,018,966 B2* 7/2018 Ely ........................ G04G 21/00
(Continued)

*Primary Examiner* — Ariel A Balaoing
(74) *Attorney, Agent, or Firm* — Winston Hsu

(57) ABSTRACT

A method of an optical sensor apparatus which is to be used with a controlling device arranged for controlling an object having a long shape and flexible form of a material, includes: using a light emitting circuit to generate and output a light ray to a surface of a portion of the object; sensing the light ray reflected from the surface for multiple times to generate multiple images; detecting at least one motion image in the generated multiple images; and, determining a motion, an offset, or a rotation angle of the object, which is controlled by the thread controlling device, according to the detected at least one motion image.

15 Claims, 16 Drawing Sheets

Related U.S. Application Data continuation-in-part of application No. 16/432,952, filed on Jun. 6, 2019, now Pat. No. 10,990,195, which is a continuation of application No. 15/173,738, filed on Jun. 6, 2016, now Pat. No. 10,353,487.

(51) Int. Cl.
    *E05B 37/00*     (2006.01)
    *G06F 1/16*     (2006.01)

(56) References Cited

U.S. PATENT DOCUMENTS

| | | | | |
|---|---|---|---|---|
| 10,190,891 B1* | 1/2019 | Rothkopf | .................. | G01P 3/50 |
| 10,234,828 B2* | 3/2019 | Ely | .................. | G06F 3/0362 |
| 10,664,074 B2* | 5/2020 | Moussette | .................. | G06F 3/04845 |
| 2003/0174590 A1* | 9/2003 | Arikawa | .................. | G04B 37/106 |
| | | | | 368/319 |
| 2003/0184520 A1* | 10/2003 | Wei | .................. | G06F 3/03543 |
| | | | | 345/163 |
| 2005/0002277 A1* | 1/2005 | Fukuda | .................. | G04C 3/14 |
| | | | | 368/80 |
| 2005/0164623 A1* | 7/2005 | Huynh | .................. | H03K 17/941 |
| | | | | 454/69 |
| 2006/0012584 A1* | 1/2006 | Vassallo | .................. | G06F 3/016 |
| | | | | 345/184 |
| 2007/0242277 A1* | 10/2007 | Dolfi | .................. | G06F 3/03543 |
| | | | | 356/498 |
| 2008/0030458 A1* | 2/2008 | Helbing | .................. | G06F 3/0317 |
| | | | | 345/156 |
| 2010/0020336 A1* | 1/2010 | Hosobuchi | .................. | G04C 3/14 |
| | | | | 356/614 |
| 2012/0092970 A1* | 4/2012 | Saleh | .................. | G04B 27/002 |
| | | | | 368/308 |
| 2015/0041289 A1* | 2/2015 | Ely | .................. | H01H 25/06 |
| | | | | 200/4 |
| 2016/0166341 A1* | 6/2016 | Iordachita | .................. | G01B 11/165 |
| | | | | 250/227.14 |
| 2016/0327911 A1* | 11/2016 | Eim | .................. | G04B 37/1486 |
| 2017/0011873 A1* | 1/2017 | Ely | .................. | G06F 1/163 |
| 2017/0075305 A1* | 3/2017 | Ryu | .................. | G04G 9/0064 |
| 2017/0089735 A1* | 3/2017 | Ruh | .................. | G04C 3/005 |
| 2017/0104902 A1* | 4/2017 | Kim | .................. | G02B 7/02 |
| 2017/0139489 A1* | 5/2017 | Chen | .................. | G06F 1/169 |
| 2017/0255266 A1* | 9/2017 | Holenarsipur | .................. | G06F 3/016 |
| 2020/0089331 A1* | 3/2020 | Yang | .................. | G04G 21/00 |

\* cited by examiner

OPTICAL SENSOR APPARATUS AND METHOD CAPABLE OF ACCURATELY DETERMINING MOTION/ROTATION OF OBJECT HAVING LONG SHAPE AND/OR FLEXIBLE FORM

CROSS REFERENCE TO RELATED APPLICATIONS

This application is a continuation application of U.S. application Ser. No. 17/213,247, filed on Mar. 26, 2021, which is a continuation-in-part of U.S. application Ser. No. 16/432,952, filed on Jun. 6, 2019, which is a continuation application of U.S. application Ser. No. 15/173,738, filed on Jun. 6, 2016. The contents of these applications are incorporated herein by reference.

BACKGROUND OF THE INVENTION

1. Field of the Invention

The present invention relates to an optical sensing mechanism, and more particularly to an optical sensor apparatus and method.

2. Description of the Prior Art

Generally speaking, as for a user who is operating an electronic product (e.g., a user is pressingabutton of an electronic product), because nowadays a metal dome is generally implemented in a button of a typical electronic product (particularly, a hand-held device), the principle that a contact point switch of a metal dome is switched on when a button is pressed and the contact point switch of the metal dome is not switched on when the button is pressed is used for determining whether a user presses a button. However, a metal dome has a service life issue. After a metal dome has been used for a period of time, it is easily found that even though a button has been actually pressed, the contact point switch of the metal dome in the button still stays in a non-conducting state, thus making a corresponding function not be activated. The main reason of this situation is the oxidation of the contact point switch of the metal dome. With the increase of use time, the oxidation issue of the contact point switch will be more serious, and the probability of button function failure will be higher. Furthermore, as for a user who is operating a watch crown of a typical watch device, the watch crown of the typical watch device employs a mechanical means controlled by gear wheels, and gear wheels may be damaged under a long-term use to cause a low precision issue for user's control. Therefore, it is important to develop an identification mechanism which can identify user's operating behavior when the user is operating a button of an electronic device or a watch crown of a watch device, and can still offer high precision after a long-term use.

Further, in different products, a conventional scheme may use a physical machine such as a motor unit or a bearing shaft to move an object having a long shape and a flexible form of a material, e.g. threads, tubes, wires, etc. However, for the wires or threads, skipped stitches may frequently occur due to the physical machine, and in the conventional scheme a user or an operator needs to check if skipped stitches occur by eyes. This wastes more time and cannot effectively solve the problem. In addition, in medical applications, a person such as a surgeon or physician needs more accurately moving a medical material such as wire, thread, tube, etc., if the person performs a surgery or a medical examination for a patient. However, the conventional scheme cannot provide a solution of more accurately moving a medical material.

SUMMARY OF THE INVENTION

Therefore one of the objectives of the instant application is to provide an optical sensor apparatus and method capable of accurately determining motion/rotation of object having long shape and/or flexible form, to solve the above-mentioned problems.

According to an embodiment of the present invention, an electronic apparatus is disclosed. The electronic apparatus includes a structure and an optical navigation circuit. A first end of the structure is located inside the electronic apparatus, and a second end of the structure corresponds to a control of a user. The structure can be moved forward/backward in a specific direction or rotated in another specific direction. The optical navigation circuit is configured to capture reflection of alight emitting to the structure to detect at least one displacement of the surface image in a direction of at least one specific axis of the structure, and determine an operation of the user as performing specific behavior according to a change of the detected at least one displacement.

The electronic apparatus is an optical mouse device, and the structure is configured to realize at least one of a button function and a function of locking/unlocking a host screen. With regard to realizing the button function, since it is unlike the prior art design that is based on whether a contact point switch of a metal dome is electrically conductive to determine whether a user presses the external button, it can avoid the loose contact issue caused by oxidation of the contact point after a long-term use. Compared to the prior art design, the proposed implementation using the optical sensing technology can offer higher precision under a long-term use.

In addition, the electronic apparatus may be a rotary combination lock device, and the structure is configured to realize a password rotary disc of the rotary combination lock device. The optical sensing technology is used for realizing an electronic locking/unlocking function.

In addition, the electronic apparatus maybe a wearable device. A second end of the structure is configured to realize at least one of a button and a rotary disc for a user to operate the wearable device. The optical sensing technology is used for realizing a button function and/or a rotary disc function of a wearable device, or realizing a watch crown function of a smart watch. The optical sensing technology can offer higher precision, and avoid a mechanical gear wear issue after a long-term use.

Further, according to an embodiment, an optical sensor apparatus, which is to be used with a controlling device arranged for controlling an object having a long shape and flexible form of a material, is disclosed. The apparatus comprises a light emitting circuit and a sensing circuit. The light emitting circuit is used for generating and outputting a light ray to a surface of a portion of the object. The sensing circuit is coupled to the light emitting circuit, for controlling the light emitting circuit emitting the light ray, sensing the light ray reflected from the surface for multiple times to generate multiple images, detecting at least one motion image in the generated multiple images, and determining a motion, an offset, or a rotation angle of the object, which is controlled by the thread controlling device, according to the detected at least one motion image.

According to another embodiment, a method of an optical sensor apparatus, which is to be used with a controlling device arranged for controlling an object having a long shape and flexible form of a material, is disclosed. The method comprises: using a light emitting circuit to generate and output a light ray to a surface of a portion of the object; sensing the light ray reflected from the surface for multiple times to generate multiple images; detecting at least one motion image in the generated multiple images; and, determining a motion, an offset, or a rotation angle of the object, which is controlled by the thread controlling device, according to the detected at least one motion image.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
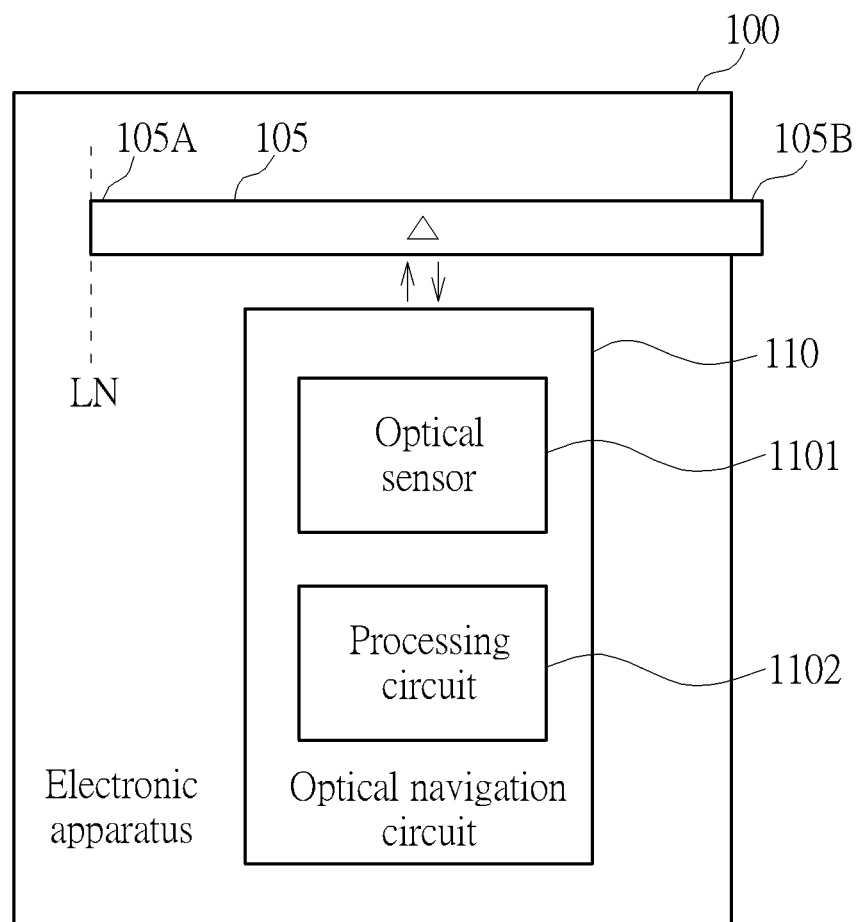
FIG. 1A is a diagram illustrating an electronic apparatus according to an embodiment of the present invention.

Please refer to FIG. 1A, which is a diagram illustrating an electronic apparatus 100 according to an embodiment of the present invention. The electronic apparatus 100 includes a structure 105 and an optical navigation circuit 110. The structure 105 can be move forward/backward in a specific direction and/or can be rotated clockwise/counterclockwise in another specific direction. A first end 105A of the structure 105 is located inside the electronic apparatus 100. A second end 105B of the structure 105 corresponds to a user's control, and can be located outside the electronic apparatus 100 (as shown in FIG. 1A) or can be located inside the electronic apparatus 100. For example, when being located inside the electronic apparatus 100, the second end 105B can be indirectly connected to a user interface (not shown in FIG. 1A) which can be used by a user to indirectly control the state of the structure 105. Alternatively, when being located outside the structure 100, the second end 105B of the structure 105 may be directly controlled by a user. In addition, the surface of the structure 105 can be designed with a specific texture pattern or marked with a specific color symbol, so as to enable the optical navigation circuit 110 to more clearly locate a surface image and precisely measure the displacement of the surface image. However, this is not intended to be a limitation of the present invention. Even though the surface of the structure 105 in another embodiment has no specific texture pattern or specific color symbol, the optical navigation circuit 110 can also precisely detect displacement of a surface image of the structure 105 by capturing a reflected light from normal surface texture of the structure 105. The triangular mark Δ in FIG. 1A represents a normal surface texture, a specific texture pattern, or a marked specific color symbol of the structure 105. In addition, the shape of the structure 105, in practice, may be an elongated structure, a column object, a needle object, and/or a rod object; however, the outward appearance characteristics, including shape, length, width, etc. of the structure 105, are not intended to be limitations of the present invention. It is also possible to realize the function of the structure 105 by using a circular structure, a square structure, etc.

Figure 1B:
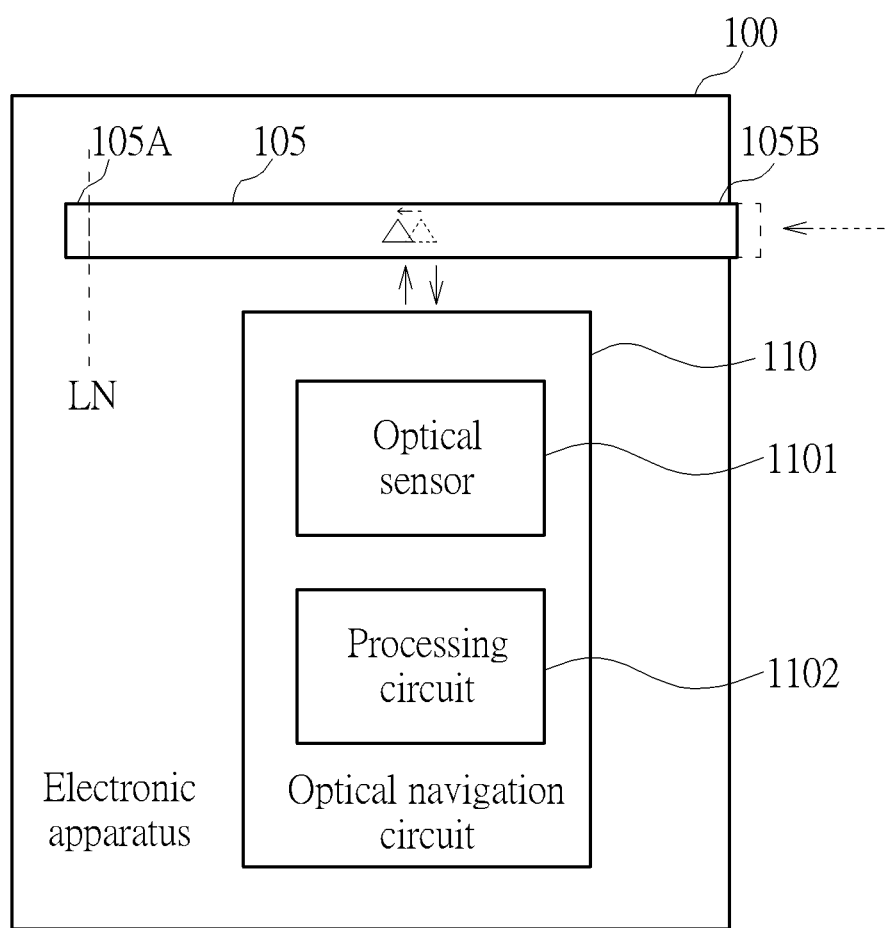
FIG. 1B is a diagram illustrating a change result of state/space location of the structure caused by user's different control.
Figure 1C:
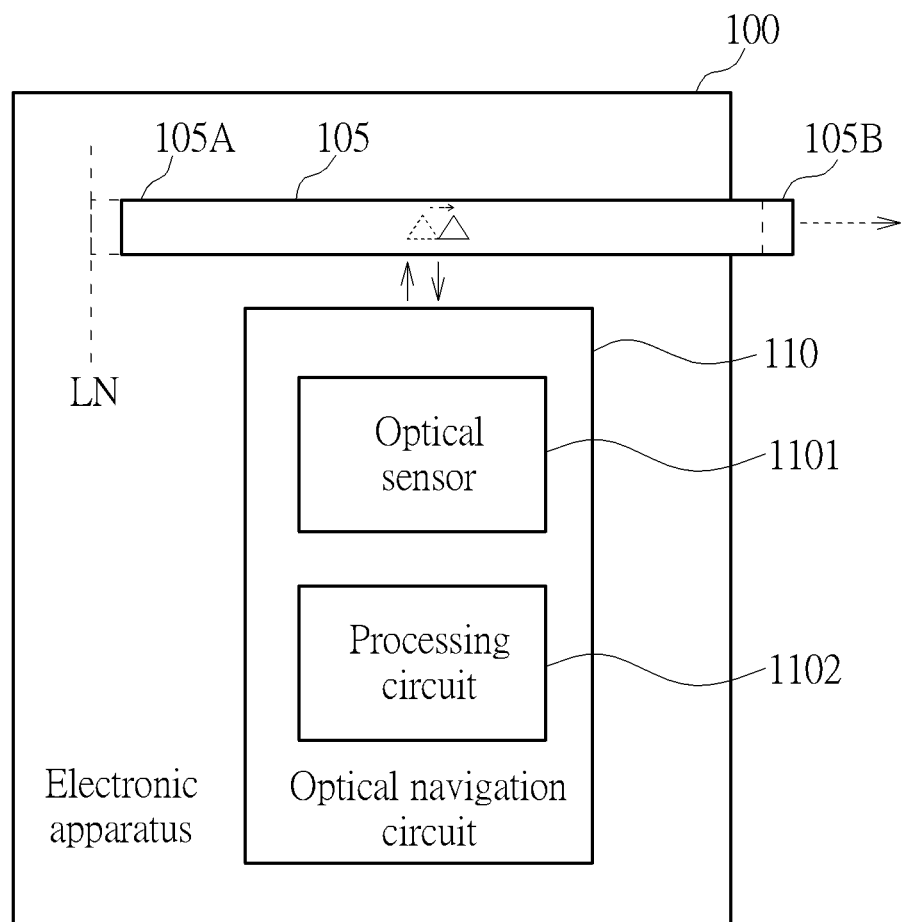
FIG. 1C is a diagram illustrating another change result of state/space location of the structure caused by user's different control.
Figure 1D:
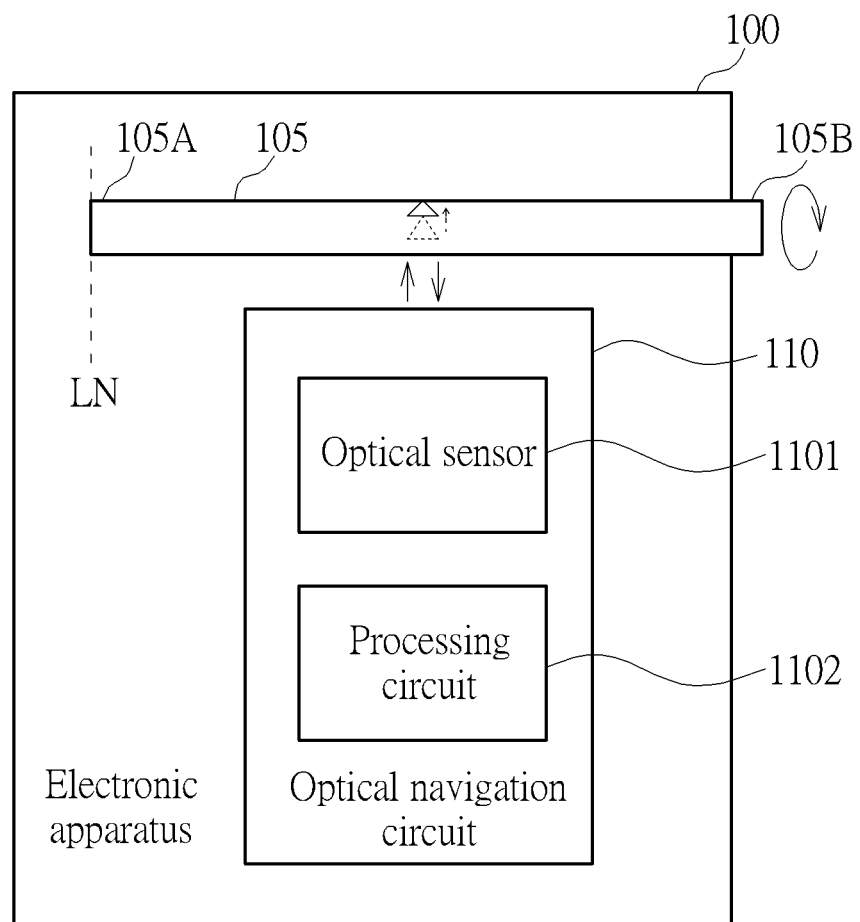
FIG. 1D is a diagram illustrating another change result of state/space location of the structure caused by user's different control.
Figure 1E:
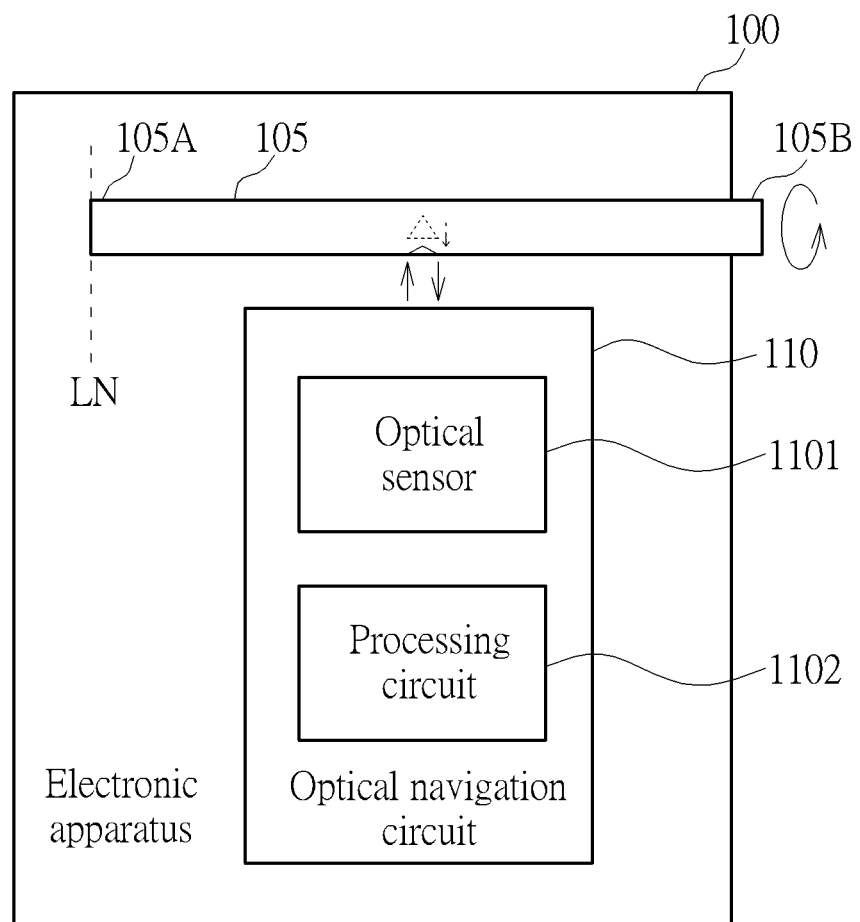
FIG. 1E is a diagram illustrating another change result of state/space location of the structure caused by user's different control.

To effectively illustrate a change of a state/spatial location of the structure 105 that results from a user's control, a dotted line LN is drawn in FIG. 1A to represent the spatial location of the structure 105 in the electronic apparatus 100 when a user is not controlling the structure 105. The dotted line LN can be regarded as a reference baseline for illustrative purposes only; however, it should be noted that, in practice, the dotted line is not required. Please refer to FIG. 1B through FIG. 1E, which are diagrams illustrating different change results of the state/spatial location of the structure 105 caused by user's different controls, respectively. As shown in FIG. 1B, a user can make the structure 105 move toward the interior of the electronic apparatus 100 by directly or indirectly pushing the second end 105B of the structure 105. Hence, the first end 105A will pass the dotted line LN, and the location of the triangular mark Δ that is representative of the surface texture will also change to have displacement. In addition, as shown in FIG. 1C, a user can make the structure 105 move toward the exterior of the electronic apparatus 100 by directly or indirectly pulling the second end 105B of the structure 105. Hence, the first end 105A will leave the dotted line LN, and the location of the triangular mark Δ that is representative of the surface texture will also change to have displacement. In addition, as shown in FIG. 1D and FIG. 1E, a user can make the structure 105 itself rotate clockwise/counterclockwise by directly or indirectly rotating the second end 105B of the structure 105 clockwise/counterclockwise. Hence, the location of the triangular mark Δ that is representative of the surface texture will have different location changes and different displacement due to the clockwise/counterclockwise rotation.

Therefore, as mentioned above, a user can make the surface texture (e.g., a certain dot or a certain area) of the structure 105 have displacement in one direction or in multiple directions by pushing forward, pulling backward, twisting left/right (i.e., rotating clockwise/counterclockwise), and/or other control ways (e.g., button pressing). For example, in response to user's different controls, the triangular mark Δ that is representative of the surface texture has different displacement amounts and different displacement directions. The optical navigation circuit 110 is located at a position nearby the structure 105 without being connected to the structure 105 (however, this is not meant to be a limitation of the present invention), and the optical navigation circuit 110 is configured to emit light upon the surface of the structure 105, capture reflection of the emitted light, sense/receive a surface image (i.e., the triangular mark A representative of the surface texture) of the structure 105, and detect/determine at least one displacement of the surface image in a direction of at least one specific axis of the structure 105 according to the surface image. The optical navigation circuit 110 can continuously sense the reflection image resulting from the light emitted upon the structure 105 under a fixed angle or a fixed location of the optical navigation circuit 110. The optical navigation circuit 110 can detect the displacement amount and displacement direction of the surface image Δ, and can also detect a change of the displacement direction of the surface image A. Next, the optical navigation circuit 110 determines the user's operation as performing the specific operating behavior (i.e., judges what kind of operating behavior the user is performing) according to a change of the detected at least one displacement. In practice, the optical navigation circuit 110 can include an optical sensor 1101 and a processing circuit 1102. The optical sensor 1101 is used for detecting the above-mentioned surface image Δ, and the processing circuit 1102 is used for calculating the displacement amount and the displacement direction of the surface image Δ and determining the operating behavior performed by a user. In addition, in another embodiment where the electronic apparatus 100 is connected to a processor of a host, the processing circuit 1102 can output the displacement amount and the displacement direction of the surface image Δ to the processor of the host, so as to use the computation resource of the processor of the host to determine the operating behavior performed by a user. The effect of determining user's operating behavior according to displacement of the surface image Δ is equivalently achieved.

Therefore, through using the optical navigation circuit 110 to capture reflected light from the surface of the structure 105, the optical navigation circuit 110 can capture and sense the surface image Δ when the structure 105 moves forward/backward or rotates clockwise/counterclockwise, and can detect at least one displacement (which includes an displacement amount and a displacement direction) of the surface image Δ in a direction of at least one specific axis of the structure 105. Next, the optical navigation circuit 110 determines that the user's current operation makes the structure 105 be pushed forward, be pulled backward, be rotated, or have a combination of actions mentioned above, and accordingly determines what kind of operating/controlling behavior the user is performing. As for the above-mentioned example, the electronic apparatus 100 uses the operations of the structure 105 and the optical navigation circuit 110 to detect and determine that a user is currently performing a button pressing control, or the electronic apparatus 100 uses the operations of the structure 105 and the optical navigation circuit 110 to determine that a user is currently performing a rotating control, and determine the clockwise/counterclockwise rotation angle, an order of different rotation angles, etc. Therefore, architecture and operation of the electronic apparatus 100 shown in FIG. 1 can be applied to different technology fields, such as an electronic apparatus with a button function for realizing a button pressing function or an electronic apparatus with a watch function for realizing a watch crown function. It should be noted that, the spirit of the present invention lies in sensing displacement (which includes a displacement amount and a displacement direction) of the surface image Δ of the structure 105 in at least one direction by using the optical navigation circuit 110 to determine the operating/controlling behavior of a user operating the electronic apparatus 100, and it is not limited to any specific application field. In addition, it should be noted that the processing circuit 1102 of the present invention can be realized by a pure hardware circuit, a software program code, or a combination of hardware and software.

For better understanding of the spirit and application of the present invention, the following discusses various embodiments that apply the concept of the electronic apparatus 100 to different fields; however, it should be noted that embodiments mentioned hereinafter are only for illustrative purposes, not limitations of the present invention.

Figure 2A:
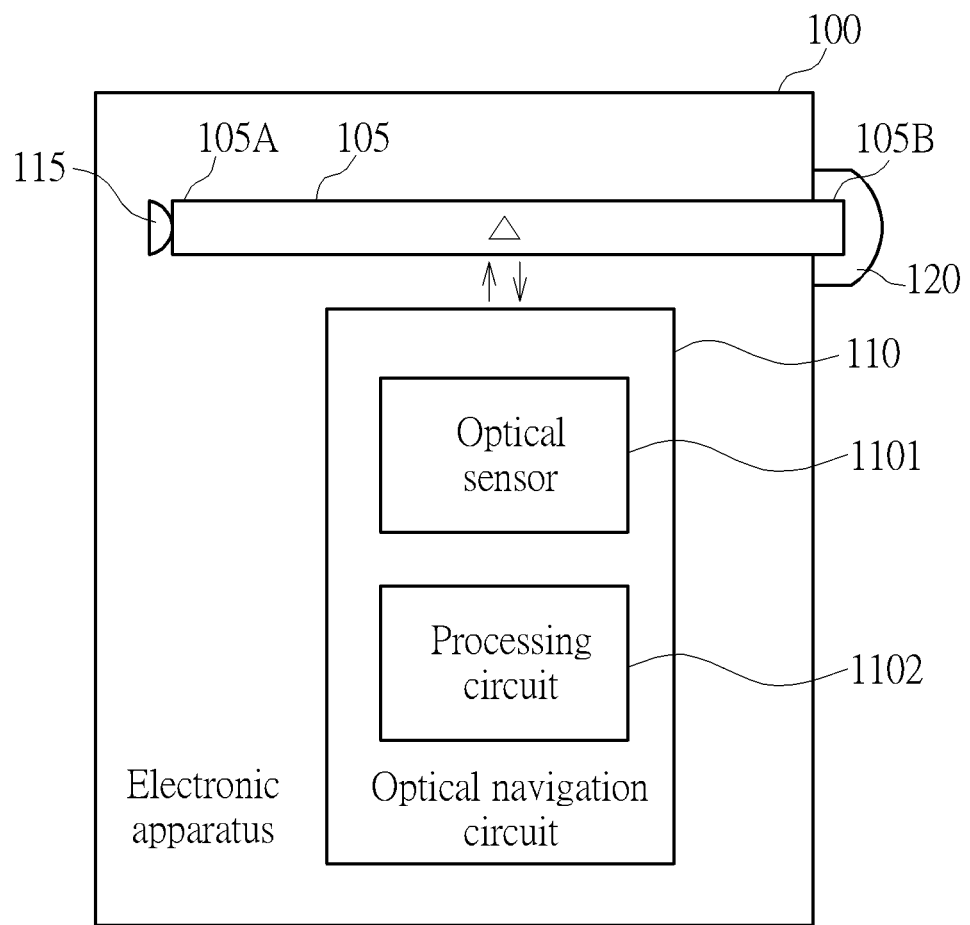
FIG. 2A is a diagram illustrating an electronic apparatus with an external button according to the first embodiment of the present invention.

In a first embodiment, the concept of the electronic apparatus 100 can be applied to an electronic apparatus with a button function. Please refer to FIG. 2A, which is a diagram illustrating an electronic apparatus 200 with an external button according to the first embodiment of the present invention. The electronic apparatus 200, for example, is a smart phone device, and the external button, for example, is the physical button under the display panel of the smart phone device. In other embodiments, the electronic apparatus 200 can also be a mouse device with external buttons. The electronic apparatus 200 includes a structure 105, an optical navigation circuit 110, a flexible structure 115, and an external button 120. If the concept of the electronic apparatus 100 is applied to an optical mouse device, the mechanism of the optical navigation circuit 110 can be combined with the optical sensor originally installed in the optical mouse device, or can be implemented using an extra optical sensor. In practice, the flexible structure 115 can be used as a buffer when a user presses the external button 120, and the buffer can be realized by a dome which can be a metal dome with electrical conducting capability, or can be realized by a common dome without electrical conducting capability. However, this is not intended to be a limitation of the present invention. The flexible structure 115 can also be realized by other flexible materials, such as a spring, a flexible button, etc. In other words, any one of a dome, a metal dome, a spring, and a flexible button can be used for realizing the flexible structure 115 of the present invention. In addition, the dome 115 can be used as a basis of confirming whether a user presses the external button 120. When a user presses the external button 120 to make the structure 105 move forward, the structure 105 will push/press the dome 115 to make the dome 115 have deformation that enables the contact point switch of the dome 115 to be electrically conductive. Hence, it can be determined that the user currently presses the external button 120. However, if a user releases/frees the external button 120 at the time of still pressing the external button 120 to make the structure 105 move backward, the structure 105 releases the dome 115 to make the dome 115 recover to its original shape, such that the contact point switch of the dome 115 is no longer electrically conductive. Hence, it can be determined that the user currently releases the external button 120.

Figure 2B:
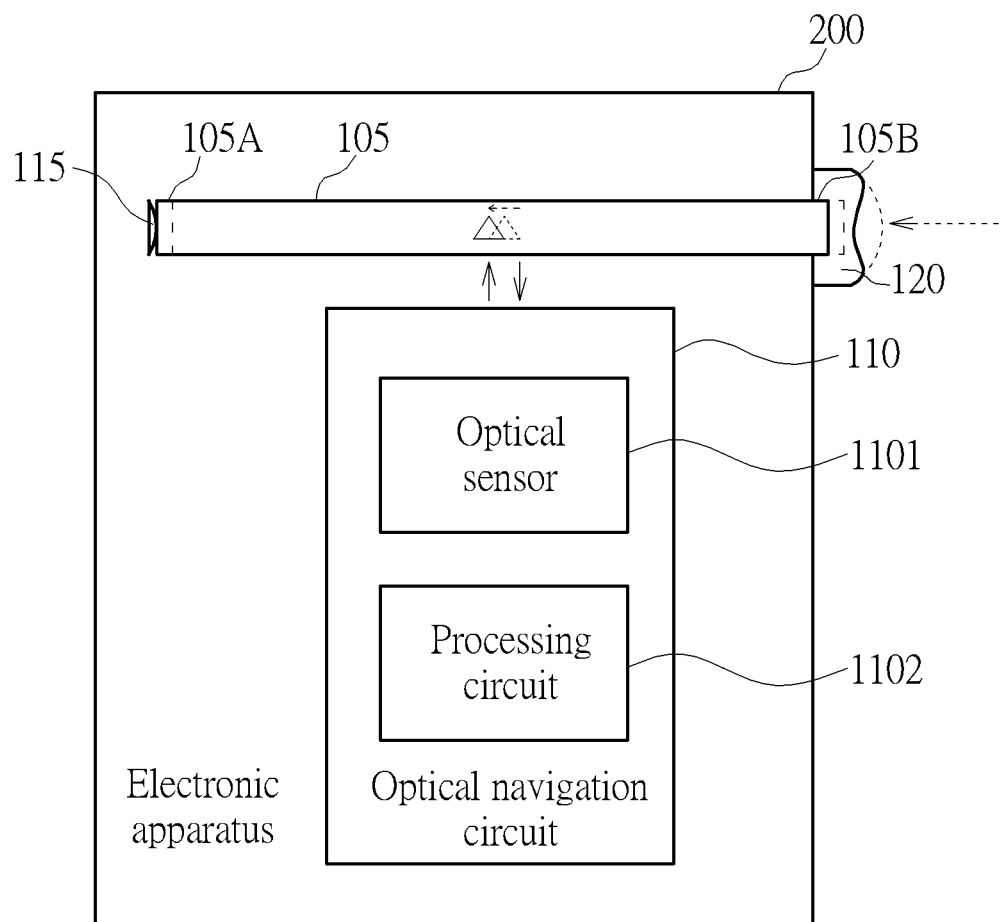
FIG. 2B is a diagram illustrating the external button of the electronic apparatus pressed by a user according to the embodiment of FIG. 2A.

With regard to the realized structure, the first end 105A of the structure 105 is located inside the electronic apparatus 100 and connected to the dome 115, and the second end 105B of the structure 105 corresponds to a user's control. For example, the second end 105B is connected to the external button 120, and a user can indirectly control the state and/or spatial location of the structure 105 by pressing/releasing the external button 120. FIG. 2B is a diagram illustrating the external button 120 pressed by a user according to the embodiment of FIG. 2A. When a user presses the external button 120, a state of the structure 105 generates displacement. At this moment, the dome 115 is used as a buffer to thereby deform (the dome 115 will be simultaneously electrically conductive if the dome 115 has a contact point switch). Like the traditional mechanism, the electronic apparatus 200 can detect whether a user presses the external button 120 by determining the electrical conduction state of the contact point switch. In addition, in order to avoid a loose contact situation of a contact point switch under a long-term use, the electronic apparatus 200 preferably detects whether a user presses the external button 120 by using the optical navigation circuit 110 to detect displacement of the surface image Δ on the structure 105. When displacement of the sensed surface image Δ is detected as moving along the central axis of the structure 105 itself and moving toward the dome 115 and the amount of the displacement is larger than a specific threshold value (which is used for avoiding misjudgment), the optical navigation circuit 110 can determine the user's operation as pressing the external button 120. However, considering a case where the operating state changes from the state of FIG. 2B to the state of FIG. 2A, when displacement of the sensed surface image Δ is detected as moving along the central axis of the structure 105 and moving toward the external button 120 and the amount of the displacement is larger than the specific threshold value, the optical navigation circuit 110 can determine the user's operation as releasing the external button 120. Therefore, the aforementioned operation of using the optical navigation circuit 110 to sense displacement of the surface image Δ of the structure 105 to detect whether a user presses the external button 120 may not need to refer to whether a contact point switch of the dome 115 is switched on. Therefore, even though the dome 115 has a loose contact situation caused by oxidation of the contact point after a long-term use, the loose contact situation will not influence the precision of operation required for the present invention to determine whether a user presses the external button 120.

In addition, the electronic apparatus 200 can continuously detect displacement of the surface image Δ on the structure 105 by using the optical navigation circuit 110 to generate multiple displacement detections of the surface image Δ at successive different time points, and determine whether a user presses the external button 120 by determining changes of directions of the multiple displacement detections generated sequentially. For example, concerning two successive displacement detections of the surface image Δ, the optical navigation circuit 110 can sense displacement of the surface image Δ to thereby detect first displacement and second displacement of the structure 105 along the central axis. Next, the optical navigation circuit 110 detects whether a user presses or releases the dome 115 via the second end 105B of the structure (i.e., the optical navigation circuit 110 can determine whether a user's operation results in deformation of the dome 115) according to whether the first displacement and the second displacement sequentially satisfy a specific displacement condition. If the first displacement corresponds to forward movement of the structure 115 (i.e., movement toward the interior of the electronic apparatus 200) and the second displacement corresponds to backward movement of the structure 105 (i.e., movement in an opposite direction), that is to say, the first displacement and the second displacement sequentially correspond to two displacement amounts in opposite directions along the central axis, and the order of the displacement shows that the structure 105 is determined as moving forward first and then moving backward so as to make the dome 115 be pressed first and then be released, the optical navigation circuit 110 can determine that the user presses the external button 120 and then immediately releases the external button 120. Hence, it can be determined that the user has pressed the external button 120 once. However, if the first displacement and the second displacement sequentially correspond to two displacement amounts in the same direction along the central axis and the direction is facing toward the dome 115, the optical navigation circuit 110 can determine that the user keeps on pressing the external button 120.

In addition, in order to avoid misjudgment, when each of displacement amounts of the above-mentioned first displacement and second displacement is smaller than a specific displacement amount, although the optical navigation circuit 110 detected the first displacement and the second displacement of the surface image Δ, it can selectively decide not to refer to the first displacement and the second displacement to determine that the user presses or releases the external button 120 (i.e., at the moment, it can selectively decide not to refer to the first displacement and the second displacement to determine whether the user's operation makes the dome 115 be pressed first and then be released). In addition, most of the user's operations do not have the behavior of pressing the button several times during an extremely short period of time. Therefore, in order to avoid misjudgment, when each of the amounts of the above-mentioned first and second displacement is detected as being larger than the specific displacement amount for the first time (i.e., when it is detected that a user presses the external button 120 for the first time in a recent period of time), even though multiple displacement amounts are detected during a subsequent extremely short time interval, the optical navigation circuit 110 can also selectively temporarily stop referring to the displacement of the surface image Δ on the structure 105 to determine a user's operation. Therefore, even though the flexible structure 115 of the present invention is realized by a flexible material (e.g., a spring), the misjudgment resulting from multiple rebounds of the flexible material itself can be avoided.

Figure 3:
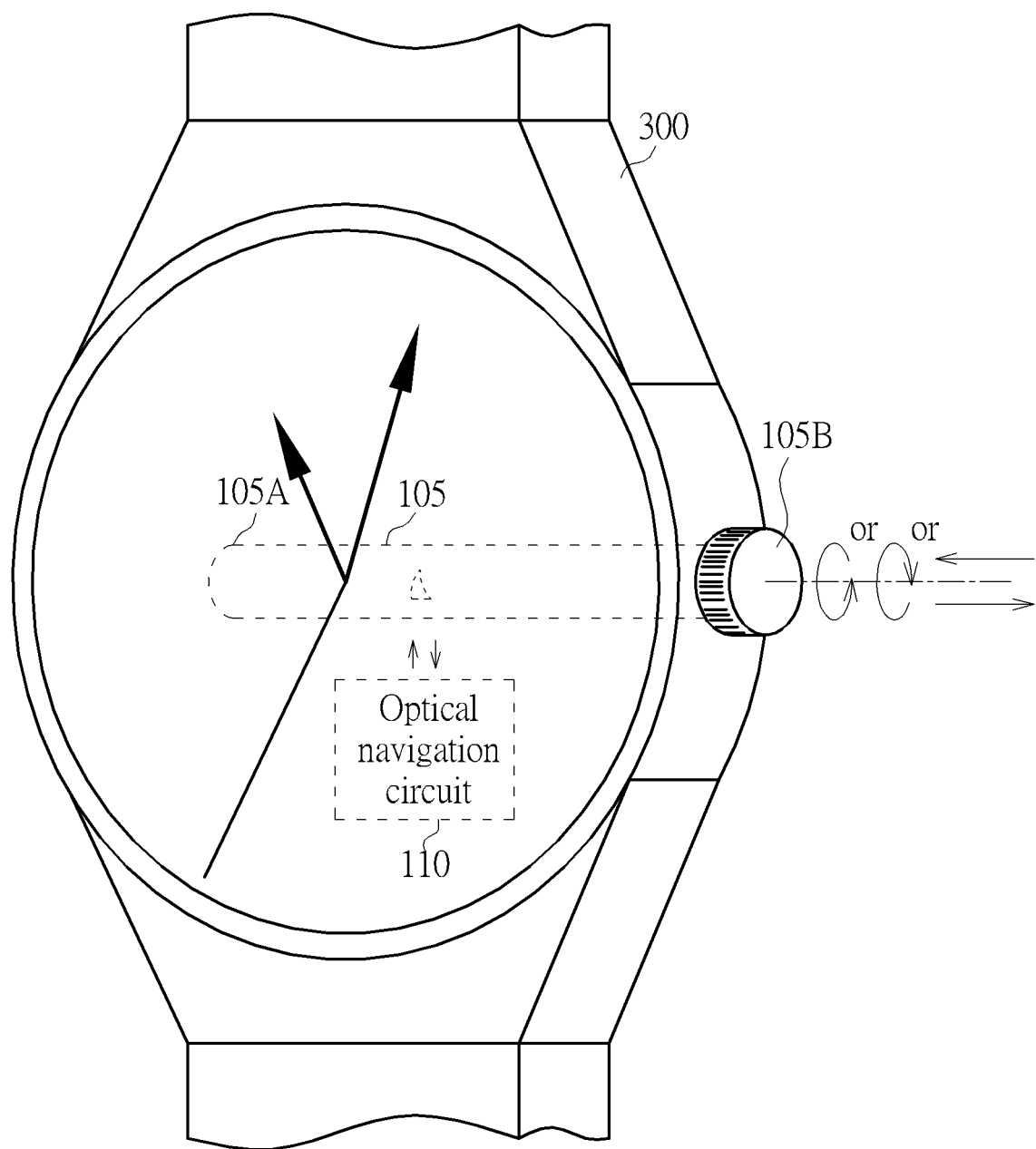
FIG. 3 is a diagram illustrating an embodiment of applying the concept of the electronic apparatus shown in FIG. 1A to a smart watch device.

Moreover, in another embodiment, the concept of the electronic apparatus 100 can be applied to an electronic device with a watch crown function (e.g., a wearable device with a rod-shaped control end, a smart watch device, or a smart wristband with a rod-shaped control end). Please refer to FIG. 3, which is a diagram illustrating an embodiment of applying the concept of the electronic apparatus 100 shown in FIG. 1A to a smart watch device. The electronic apparatus 300 is a smart watch device whose interior includes the above-mentioned structure 105 and optical navigation circuit 110 (represented with a dotted-line block). The second end 105B of the structure 105 is used as a graduated rotary disc of a watch crown, and texture can be depicted on the second end 105B to be convenient for a user to control. The user can rotate the structure 105 along the central axis of the structure 105 via the graduated rotary disc. As shown in FIG.

3, the user can rotate the watch crown (the second end 105B) clockwise, rotate the watch crown (the second end 105B) counterclockwise, push the watch crown (the second end 105B) forward, and/or pull the watch crown (the second end 105B) backward to perform different controls. The different control behavior causes changes of state or spatial location of the structure 105, and the location of the triangular mark Δ that represents the surface texture/image also changes to have displacement in at least one direction. Through emitting light to the surface of the structure 105, the optical navigation circuit 110 can capture reflection of the light, sense/receive the surface image Δ of the structure 105, detect or determine at least one displacement of the surface image Δ in a direction of at least one specific axis (e.g., central axis and/or transverse axis) of the structure 105. The optical navigation circuit 110 can continuously sense reflection image (which results from the light emitted to the structure 105) at a fixed angle or a fixed location of the optical navigation circuit 110, detect an displacement amount and a displacement direction of the surface image Δ, and also detect a change of a displacement direction of the surface image Δ. As for a transverse axis of the structure 105, the optical navigation circuit 110 can detect and determine a rotation amount and a rotation direction of the structure 105 after the structure 105 is rotated. Next, the optical navigation circuit 110 determines which specific operating behavior that the user has according to a change of the detected at least one displacement, and determines a movement change or an angle change caused by the user's specific operating behavior, such as a corresponding angle and direction of the structure 105 rotated by the user. Therefore, through realizing the structure 105 and the optical navigation circuit 110 in the electronic apparatus 300 of a smart watch, it is effective to employ the optical navigation sensing technique to detect and determine user's operating behavior for a smart watch, such as determining that the user is currently adjusting the watch time, the user is currently controlling a display range of a web page (if the smart watch is currently running a web browser application), the user is currently zooming a map (if the smart watch is currently running a map application), and/or the user is currently controlling a display range of an email content (if the smart watch is currently running an email application). It should be noted that, the different applications mentioned above are only for illustrating the notable benefits of applying the present invention to a wearable electronic apparatus with a rod-shaped control end, and they are not intended to be limitations of the present invention. In addition, the operations of the structure 105 and the optical navigation circuit 110 can realize a button function of a wearable electronic device, or can realize a button function and a rotary disc (e.g., a watch crown of a smart watch) function of a wearable electronic device simultaneously.

Moreover, in yet another embodiment, the operations of the structure 105 and the optical navigation circuit 110 can be applied to realizing a combination lock function, such as being applied to a mouse device and/or a combination lock device. Please refer to FIGS. 1A, 1D and 1E again. Taking a mouse device as an example, the second end 105B of the structure 105 is depicted with different graduations having different angles. When a user uses a mouse device to lock or unlock a screen of a host screen, the user can, for example, rotate clockwise by 30 graduations first and then rotate counterclockwise by 50 graduations to lock or unlock the screen. In response to the user's operation, the structure 105 also rotates clockwise first and then rotates counterclockwise. Therefore, the location of the surface image Δ has displacement with different directions and different displacement amounts. The optical navigation circuit 110 calculates the changed displacement amount and displacement direction by sensing the location of the surface image Δ, thereby determining the user's operation as rotating the structure 105 clockwise by 30 graduations first and then rotating the structure 105 counterclockwise by 50 graduations. Hence, it is determined that the user currently attempts to use a mouse device to lock or unlock the screen of the host. As mentioned above, the operation of the structure 105 and the optical navigation circuit 110 can realize a button function of a mouse device or a function of locking/unlocking a screen of a host,. That is, at least one of the functions can be realized.

Furthermore, taking a combination lock as an example, the second end 105B of the structure 105 in FIG. 1A can be connected to a password rotary disc controlled and operated by a user. Similarly, the user can rotate the password rotary disc clockwise by A graduations first and then rotate the password rotary disc counterclockwise by B graduations, so as to perform locking or unlocking. In response to the user's operation, the structure 105 also rotates clockwise first and then rotates counterclockwise. Therefore, the location of the surface image Δ will have displacement with different directions and different displacement amounts. The optical navigation circuit 110 calculates the changed displacement amount and displacement direction by sensing the location of the surface image Δ, thereby determining the user's operation as rotating the structure 105 clockwise by A graduations first and then rotating the structure 105 counterclockwise by B graduations. Hence, it is determined that the user currently attempts to perform locking or unlocking. A combination lock device can be applied to an anti-theft door lock, a rotary combination lock of a safe, etc. It should be noted that, the embodiments mentioned in the above paragraphs are only for illustrating that the operation of the structure 105 and the optical navigation circuit 110 of the present invention can be applied to different implementations, and they are not intended to be limitations of the present invention.

Figure 4:
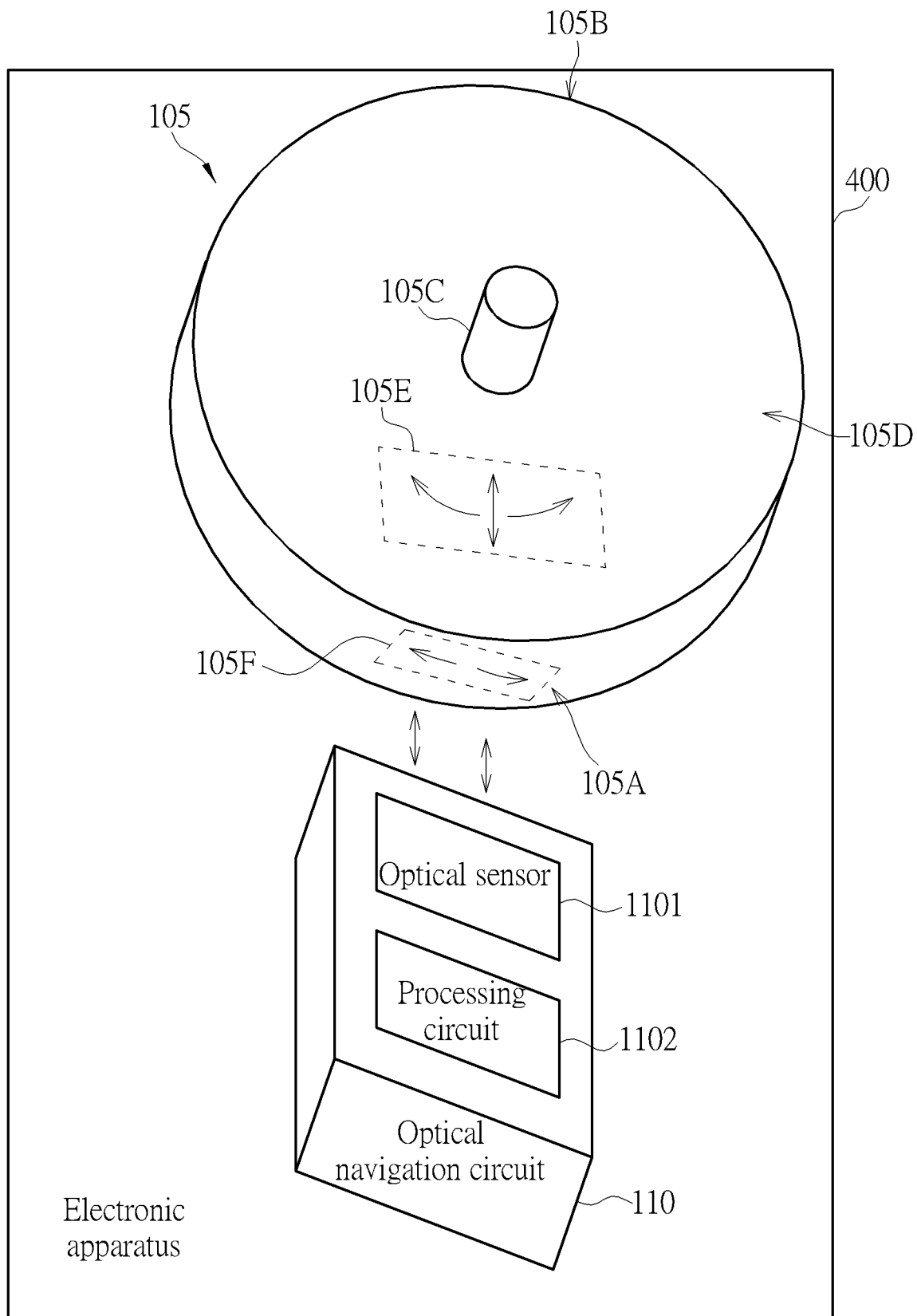
FIG. 4 is a diagram illustrating the concept of realizing the structure by a roller element according to an embodiment of the present invention.

Moreover, in still yet another embodiment, the above-mentioned structure can be realized by using a roller element. Please refer to FIG. 4, which is a diagram illustrating the concept of realizing the structure 105 by a roller element according to an embodiment of the present invention. As shown in FIG. 4, the electronic apparatus 400 includes a structure 105 that is realized by a roller element, and further includes the above-mentioned optical navigation circuit 110. The roller element 105 includes a wheel shaft 105C and a runner hub 105D. The wheel shaft 105C passes through the runner hub 105D. The roller element 105 corresponds to a user's control and therefore moves forward/backward, moves up/down, or makes the runner hub 105D rotate. For example, the electronic apparatus 400, in practice, can be an optical mouse, and the roller element 105 can be a user-controllable roller on the optical mouse. The first end 105A of the roller element 105 is located inside the optical mouse, and the second end 105B of the roller corresponds to a user's control. A user can press the second end 105B of the roller element 105 to make the second end 105B move up/down, or can rotate the roller element 105 to make the runner hub 105D rotate. The optical navigation circuit 110 is used for detecting at least one displacement of a surface image on a wheel face of the runner hub 105D to determine displacement of the surface image in a direction of at least one specific axis of the roller element 105. For example, the wheel face may be at least one of a circumferential end surface of the runner hub 105D and a wheel face in the direction of a radius of the runner hub 105D. That is to say, concerning the circumferential end surface, the optical navigation circuit 110 can detect, for example, the dotted-line area 105F to measure displacement of the surface image on the circumferential end surface, so as to determine a change of a rotation amount or a change of rotation angle caused by the user's specific operating behavior, such as a rotation amount and a rotation direction of the roller rotated by a user. In addition, concerning a wheel face in the direction of the radius, the optical navigation circuit 110 can detect, for example, the dotted-line area 105E to measure displacement of the surface image on the wheel face in the direction of the radius, so as to determine a change of a rotation amount or a change of a rotation angle caused by the user's specific operating behavior. In addition, the optical navigation circuit 110 can also determine a change of an upward/downward movement amount and a movement direction of the roller element 105 caused by the user's specific operating behavior.

Further, the operation of capturing reflected light from a surface texture to precisely detect the displacement of the surface texture can be applied into an object having a long shape and/or flexible form of a material so as to more accurately measure or estimate the behavior of a user controlling or using such object. For example, the material may be a thread. In addition, in other embodiments, the material may be a medical grade material, and the object is a thread, a wire, a tube, or a catheter made from the medical grade material. Such object can be a variety of kinds of objects having along shape and/or a flexible form. The material of the object mentioned above can have different colors or may be transparent, translucent, or opaque.

Figure 5:
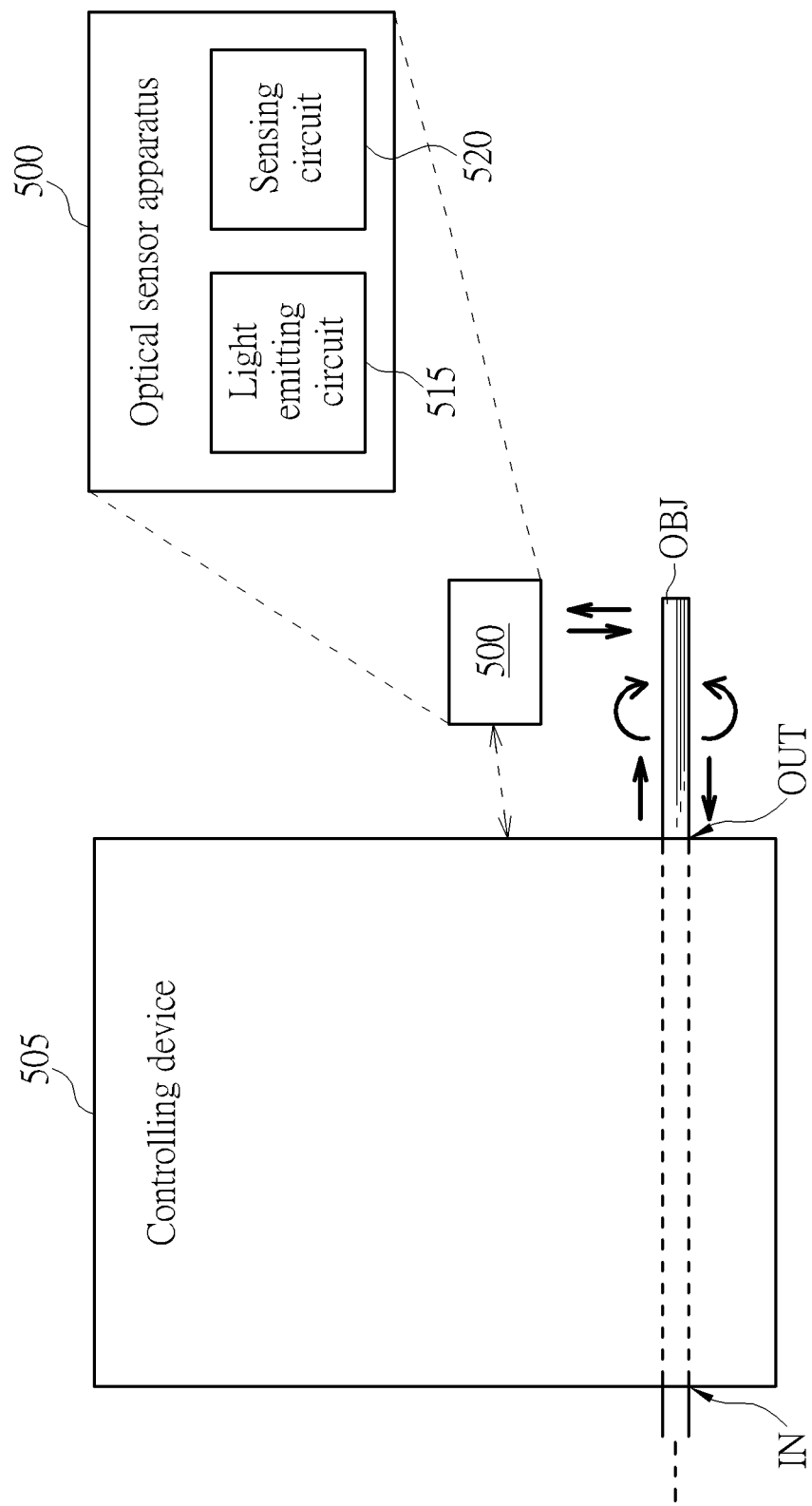
FIG. 5 is a diagram of an optical sensor apparatus according to an embodiment of the invention.

FIG. 5 is a diagram of an optical sensor apparatus 500 according to an embodiment of the invention. The optical sensor apparatus 500 is to be used with a controlling device 505, which is controlled by a user or an operator and is arranged for controlling an object OBJ having a long shape and/or a flexible form of a material. For example, the object OBJ may be a thread, a tube, a catheter, a wire, or other different objects having the long shape and/or the flexible form, etc. In addition, the material may be a medical grade material or other flexible materials.

Figure 6:
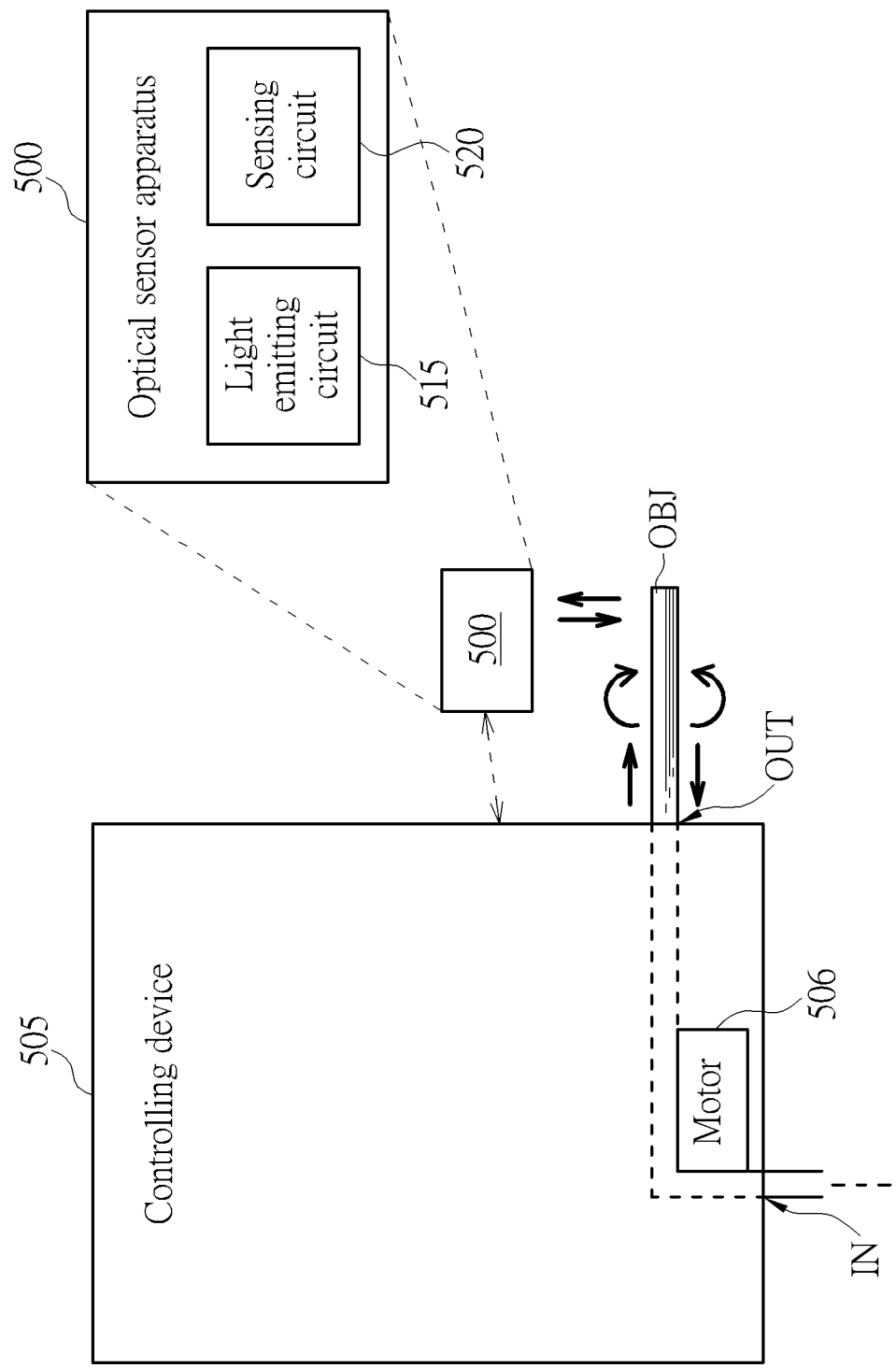
FIG. 6 is a diagram showing an example of the controlling device using a motor unit to move the object OBJ.

The controlling device 505 comprises at least one input hole/terminal IN for receiving an end (i.e. a front end) of the object OBJ and at least one output hole/terminal OUT for outputting the front end of such object OBJ, and it can be used, controlled, or operated by a user or an operator to move forward/backward the object (or the front end) and/or rotate such object (or the front end) with any angle(s) by using a motor unit (but not limited). The controlling device 505 for example may be a thread controlling device such as a bearing shaft of a motor in an automatic sewing machine or a printing device; however, this is not meant to be a limitation. In medical applications, the controlling device 505 may be any medical therapy device or test/examination/measurement device. FIG. 6 is a diagram showing an example of the controlling device 505 using a motor unit 506 to move the object OBJ. In addition, the user or operator may configure the controlling device 505 automatically move the object OBJ with a specific speed or may manually control the controlling device 505 to move the object OBJ.

Figure 7:
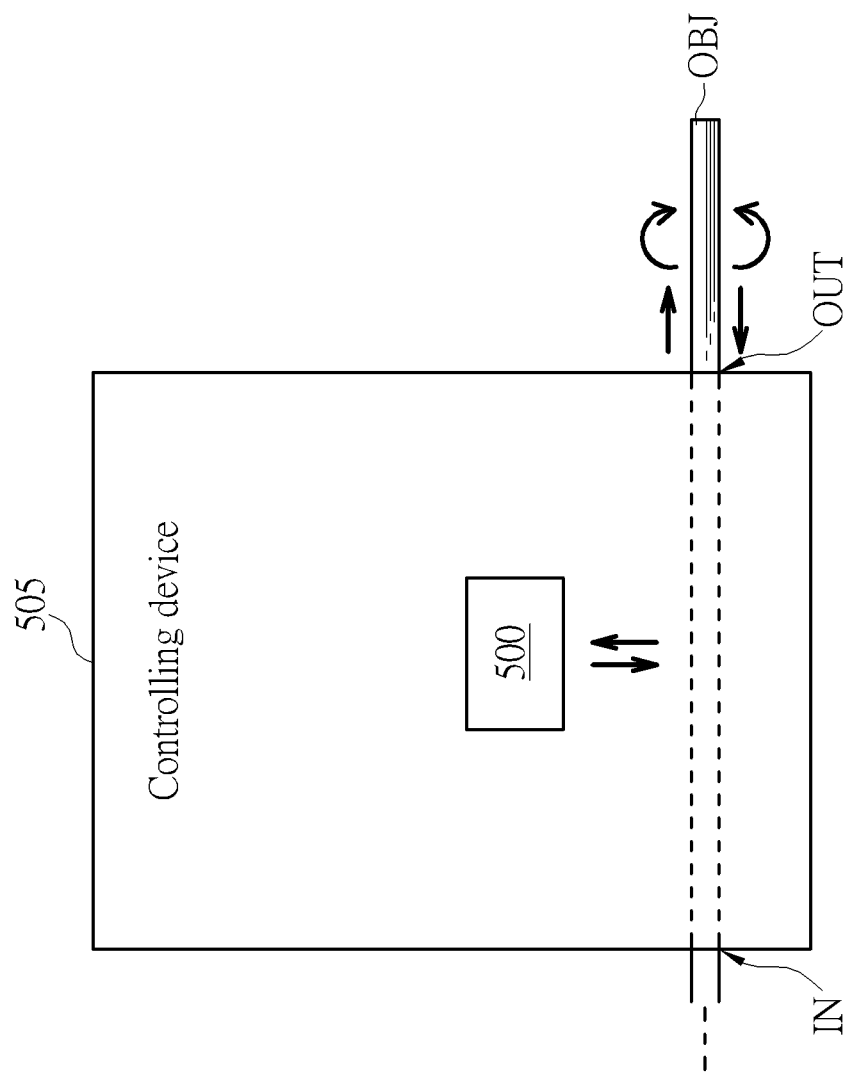
FIG. 7 is a diagram showing an example of the optical sensor apparatus configured within the controlling device according to an embodiment of the invention.

It should be noted that the optical sensor apparatus 500 can be used with different kinds of controlling device 505 to precisely measure the movement, motion, rotation of the object OBJ (the front end or any portion). Further, in other embodiments, the optical sensor apparatus 500 can be configured or installed within the controlling device 500 to detect the movement, motion, and/or rotation angle of the object OBJ by detecting the images generated by sensing reflected light from the object's portion which is inside the controlling device 505. FIG. 7 is a diagram showing an example of the optical sensor apparatus 500 configured within the controlling device 500 according to an embodiment of the invention. In FIG. 7, the optical sensor apparatus 500 inside the controlling device 500 can precisely calculate or estimate the movement, motion, and/or rotation angle of a portion of the object OBJ outside the controlling device 500 by detecting the motion change of image patterns in the capture images generated by the reflected light from the surface of another portion of the object OBJ inside the controlling device 500.

In the above embodiments, the optical sensor apparatus 500 can be arranged to accurately detect/calculate the distance actually moved by the controlling device 505 by detecting the patterns of the captured images generated by reflected lights from the surface of the object. Equivalently, the optical sensor apparatus 500 can detect the actual or real-time moving speed of the object. In practice, the optical sensor apparatus 500 comprises a light emitting circuit 515 and a sensing circuit 520 such as a processing circuit or a processor. The light emitting circuit 515 is arranged for generating and outputting light ray(s) to at least one surface of at least one portion of the object OBJ. The sensing circuit 520 is coupled to the light emitting circuit 515, and it is used for controlling the light emitting circuit 515 emitting the light ray(s), sensing the light ray(s) reflected from the surface(s) for multiple times to generate multiple captured images, detecting at least one motion image in the generated multiple images, and determining a motion, an offset, or a rotation angle of the object, which is controlled by the controlling device 505, according to the detected at least one motion image. For instance, this can be implemented by detecting the motion(s) of the image pattern(s) in the motion image.

The sensing circuit 520 then outputs the determined/detected motion, offset, and/or rotation angle to the controlling device 505 so that the user operating or controlling the controlling device 505 can know the precisely estimated motion, offset, and/or rotation angle of such object OBJ as well as can more accurately move and/or rotate the object OBJ such as the thread, tube, catheter, or other objects. Also, outputting the determined/detected motion, offset, and/or rotation angle can make the controlling device 505 control the object OBJ with a fine adjustment based on the determined/detected motion, offset, and/or rotation angle. In addition, the optical sensor apparatus 500 can communicate with the controlling device 505 via wired or wireless communication(s) to transmit the information of the determined/detected motion, offset, and/or rotation angle to the controlling device 505 and/or to receive specific indication information from the controlling device 505.

Further, it should be noted that in other embodiments the light emitting circuit 515 may be an optional circuit. For example, the light emitting circuit 515 may be excluded from the optical sensor apparatus 500 if the light emitting circuit 515 is not needed in a sufficient ambient light condition/environment.

Figure 8:
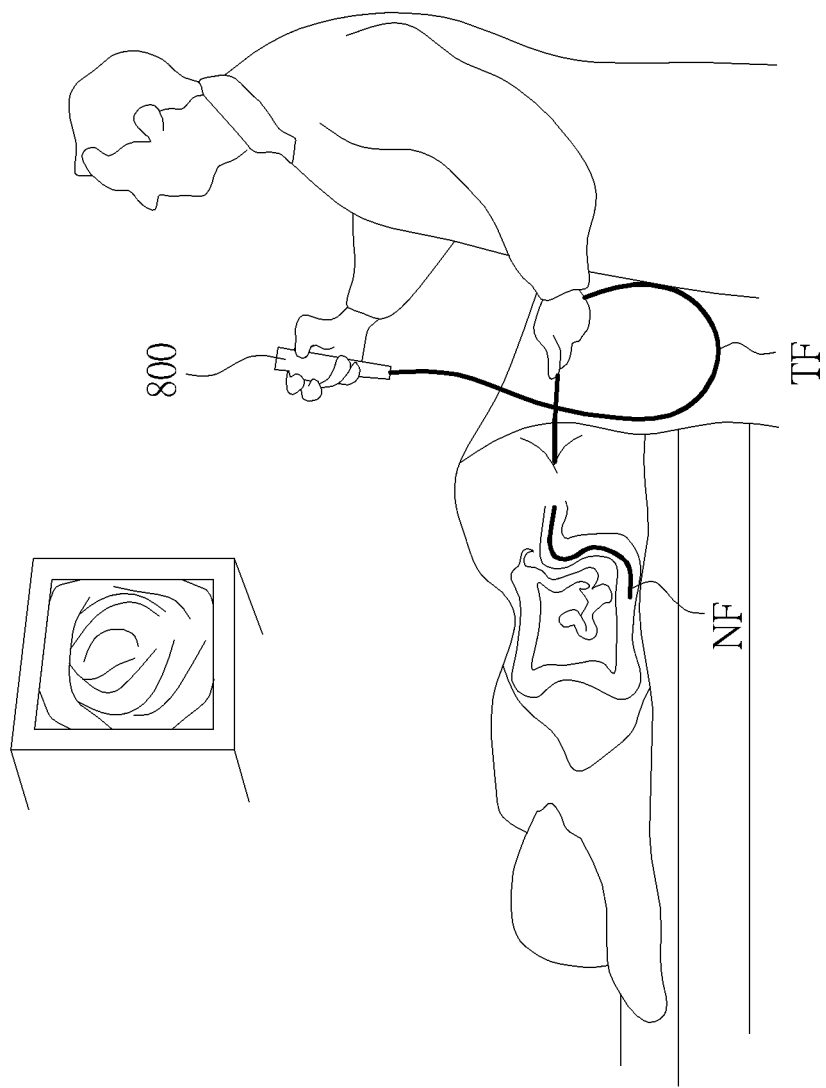
FIG. 8 is a diagram showing an example of the controlling device according to an embodiment of the invention.

In other embodiments, the above-mentioned operation can be applied into surgery or any kinds of medical tests/examinations. For example, the above-mentioned object OBJ having the long shape and the flexible form may be a medical tube TF or medical thread (but not limited) and may have an end physically connected to a non-flexible material NF, and the sensing circuit 520 is arranged for determining a motion, an offset, and/or a rotation angle of the non-flexible material NF based on the motion, the offset, and/or the rotation angle of the medical tube TF or thread outside a person such as a patient. FIG. 8 is a diagram showing an example of the controlling device 505 according to an embodiment of the invention. In FIG. 8, the medical device 800 may comprise the controlling device 505 of FIG. 7, which comprises the optical sensor apparatus 500. The optical sensor apparatus 500 is arranged for determining the motion and/or rotation of a portion of medical tube TF which is inside the medical device 800 so as to accurately estimate or calculate the motion and/or rotation of non-flexible material NF or the motion and/or rotation of the front end of medical tube TF which may be inside a person such as a patient; the non-flexible material NF for example is the camera device (but not limited) which generates the video to the video monitor for displaying the corresponding video for an medical device operator such as a physician or a surgeon.

Further, in another embodiment or applications, the non-flexible material NF may be a solid or sharp medical instrument device used for surgery. Using the optical sensor apparatus 500 to more accurately detect/determine the motion/rotation of the non-flexible material NF such as an instrument device inside a patient can more safely protect the patient. Thus, by doing so, a physician/doctor, nurse, practicing medical person, or medical technologist can use or operate a medical device integrating the detection operation/capability of optical sensor apparatus 500 to more accurately perform a medical examination/test upon a person such as a patient or more accurately perform the surgery operation such an invasive surgery for such person. The examination/test may be a health/medical examination or any kinds of endoscopy examinations (such as gastroscopy/colonoscopy examination) in which the object is a long and thin tube; however, this is not intended to be a limitation.

Figure 9:
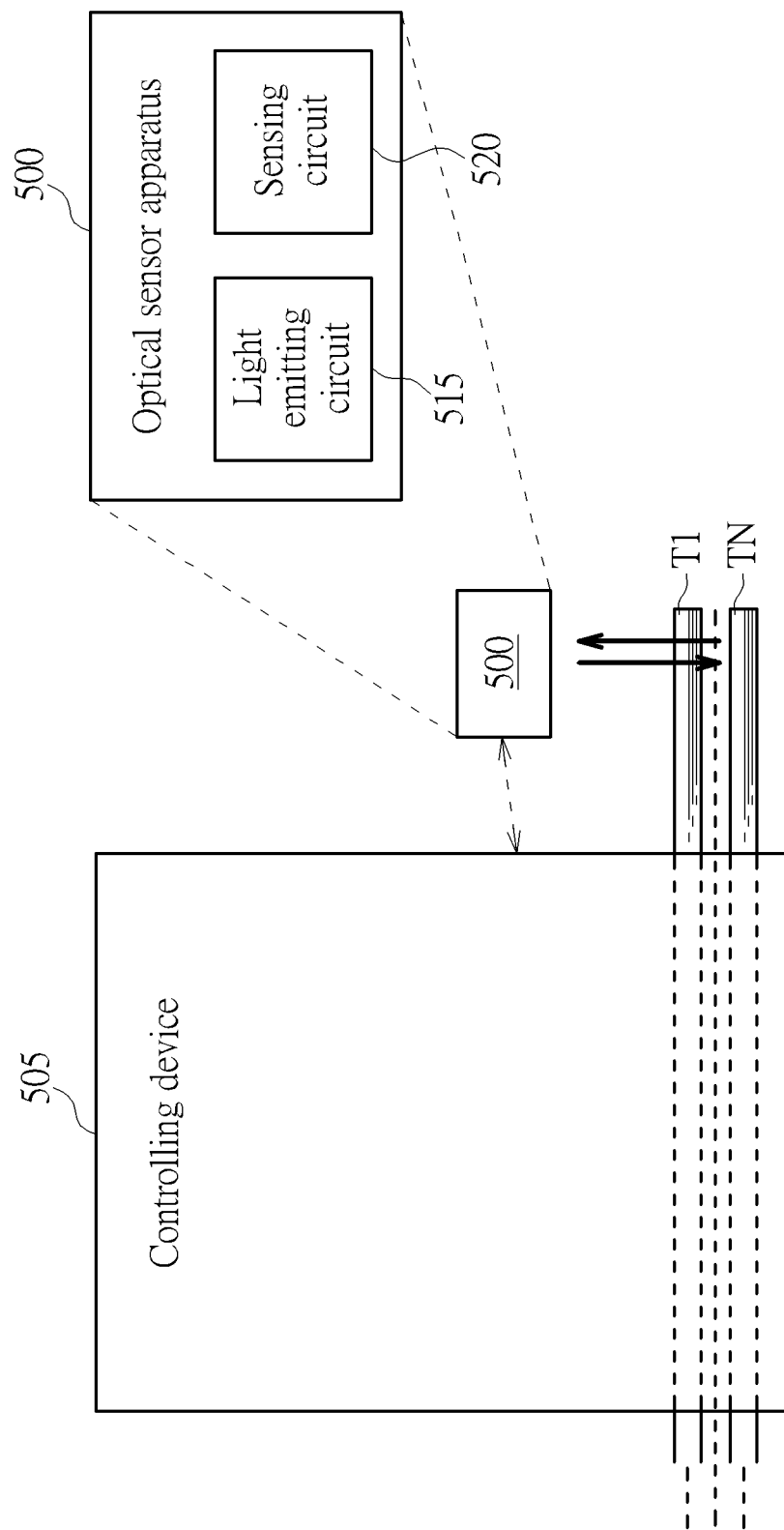
FIG. 9 is a diagram showing an example of the controlling device used as a thread feeding machine according to an embodiment of the invention.

Further, in other embodiments, the operations of optical sensor apparatus can be applied into detecting the precise movements and/or rotations of threads which may be moved by an automatic thread feeding machine such as a thread feeding machine of an automatic sewing machine (or embroidering machine) or a printing device, to more effectively avoid the occurrence of skipped stitches. FIG. 9 is a diagram showing an example of the controlling device 505 used as a thread feeding machine according to an embodiment of the invention. In FIG. 9, the controlling device 505 used as a thread feeding machine (e.g. a bearing shaft of a motor, but not limited) and can be arranged to receive, move, and feed one or multiple threads T1-TN simultaneously with different/identical speeds via multiple input holes and output holes. The threads T1-TN may have identical/different colors and/or may have identical/different radiuses. For instance, the thread T1 has a first round cross-section with a first radius, and a thread TN has a second round cross-section with a second radius that is different from the first radius. However, this is not intended to be a limitation. The optical sensor apparatus 500 in FIG. 9 can be arranged to respectively detecting the motions of the threads T1-TN. For example, the light emitting circuit 515 can respectively and simultaneously emit light rays to surfaces of portions of threads T1-TN, and the sensing circuit 520 can simultaneously sense the reflected light rays to detect the motion of the image patterns in the captured images generated based on the reflected light rays so as to calculate or estimate the actual motions of the threads T1-TN. For example, the optical sensor apparatus 500 can determine the distance of inches one or each thread is actually moved by the controlling device 505.

Figure 10:
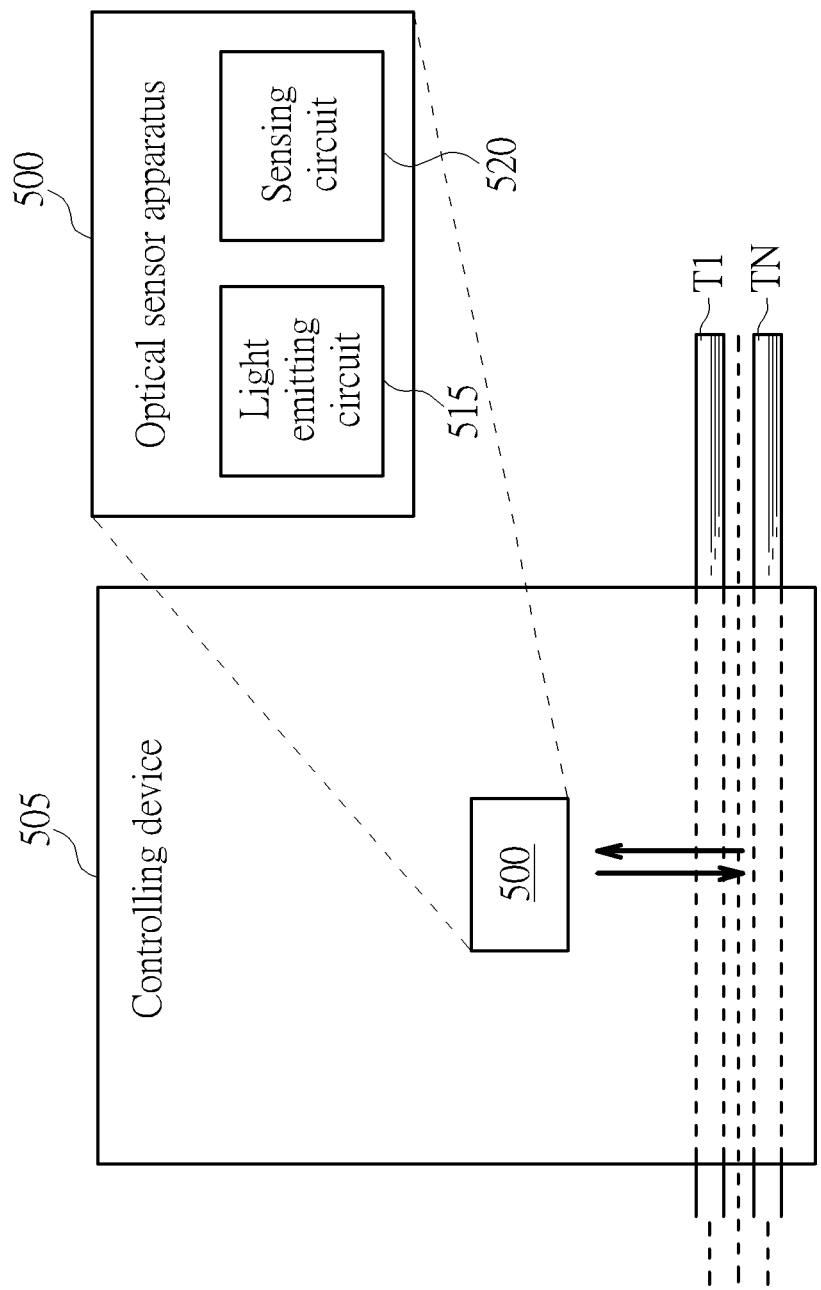
FIG. 10 is a diagram showing a modification example of the controlling device used as a thread feeding machine according to an embodiment of the invention.
Figure 11:
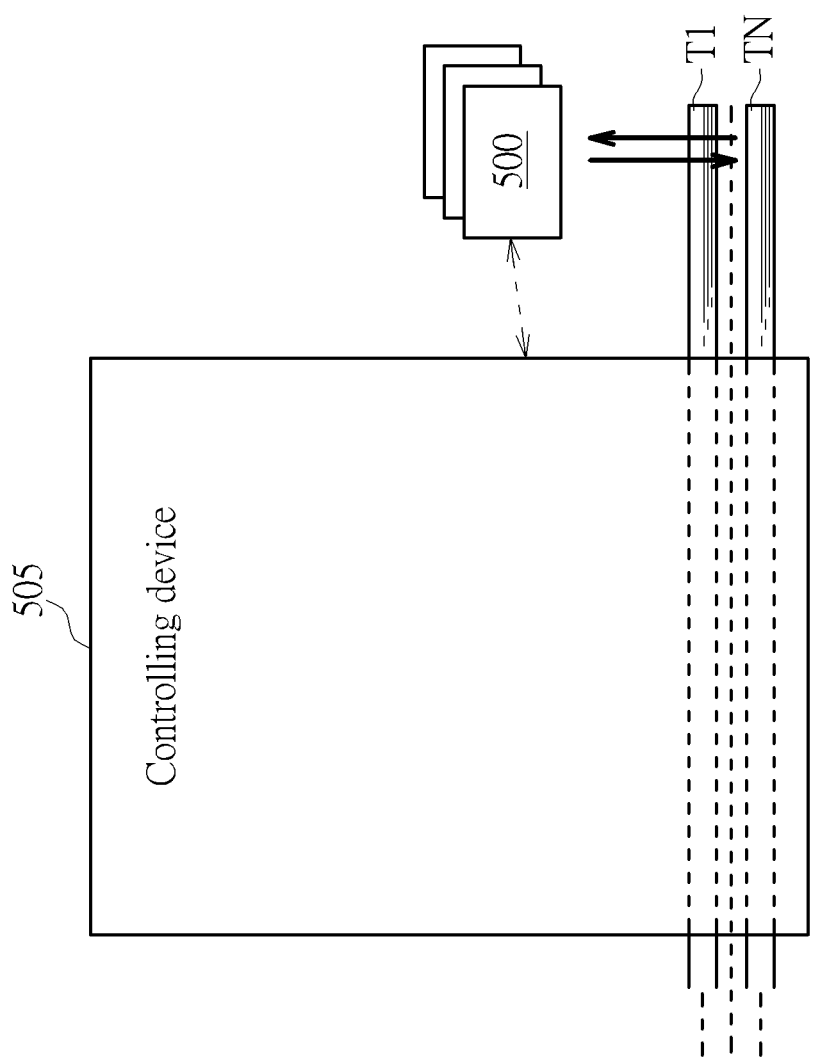
FIG. 11 is a diagram showing another modification example of the controlling device used as a thread feeding machine according to another embodiment of the invention.

Additionally, in other embodiments, the optical sensor apparatus 500 can be installed within a thread feeding machine. FIG. 10 is a diagram showing a modification example of the controlling device 505 used as a thread feeding machine according to an embodiment of the invention. Further, in another embodiment, multiple optical sensor apparatuses 500 can be used so that each optical sensor apparatus 500 can respectively determine the motion/rotation of each corresponding thread. FIG. 11 is a diagram showing another modification example of the controlling device 505 used as a thread feeding machine according to another embodiment of the invention.

Further, the sensing circuit 520 of the optical sensor apparatus 500 can be arranged for receiving an indication signal generated from the controlling device 505 such as a thread controlling device (but not limited), and the indication signal indicates an adjustment of the motion, the offset, or the rotation angle of the object OBJ such as a thread. The sensing circuit 520 then generates a response signal to the controlling device 505 to make the controlling device 520 stop controlling the thread when a motion, an offset, or a rotation angle indicated by the detected at least one motion image matches the adjustment indicated by the indication signal. That is, once the motion/rotation of the object OBJ matches an adjustment amount, specified or determined by the user or operator, the sensing circuit 520 can generate a notification signal to the controlling device 505 to provide a hint for the user or operator. In addition, a minimum diameter of the object OBJ such as a thread can be defined by an image resolution of the optical sensor apparatus 500. The optical sensor apparatus 500 with a higher image resolution can be used to precisely detect the motion/rotation of a thread having a shorter diameter.

Further, it should be noted that the above-mentioned optical sensor apparatus 500 can be arranged to detect or determine a motion, an offset, or a rotation angle of a long-shape and non-flexible object in other embodiments. The operation is similarly to those mentioned above and is not detailed for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor apparatus which is to be used with a controlling device arranged for controlling an object having a long shape and flexible form of a material, comprising:
    a light emitting circuit, for generating and outputting a light ray to a surface of a portion of the object; and
    a sensing circuit, coupled to the light emitting circuit, for controlling the light emitting circuit emitting the light ray, sensing the light ray reflected from the surface for multiple times to generate multiple images, detecting at least one motion image in the generated multiple images, and determining a motion, an offset, or a rotation angle of the object, which is controlled by the thread controlling device, according to the detected at least one motion image;
    wherein the object has an end physically connected to at least one of a sensing device and an instrument device used for surgery, and the sensing circuit is arranged for determining a motion, an offset, or a rotation angle of the at least one of the sensing device and the instrument device based on the motion, the offset, or the rotation angle of the object.

2. The optical sensor apparatus of claim 1, wherein the material is a medical grade material, and the object is a thread, a wire, a tube, or a catheter made from the medical grade material.

3. The optical sensor apparatus of claim 1, wherein the object is a thread.

4. The optical sensor apparatus of claim 3, wherein the controlling device is a thread controlling device, the thread has a first round cross-section with a first radius, and the optical sensor apparatus is used with the thread controlling device, further arranged for controlling another thread having a flexible form of another material, to determining a motion, an offset, or a rotation angle of the another thread which has a second round cross-section with a second radius different from the first radius.

5. The optical sensor apparatus of claim 3, wherein the sensing circuit is arranged for outputting the determined motion, the offset, or the rotation angle of the thread to the controlling device to make the controlling device control the thread with a fine adjustment based on the determined motion, the offset, or the rotation angle.

6. The optical sensor apparatus of claim 3, wherein the sensing circuit is arranged for receiving an indication signal generated from the thread controlling device, and the indication signal indicates an adjustment of the motion, the offset, or the rotation angle of the thread; and, the sensing circuit is arranged for generating a response signal to the controlling device to make the controlling device stop controlling the thread when a motion, a offset, or a rotation angle indicated by the detected at least one motion image matches the adjustment indicated by the indication signal.

7. The optical sensor apparatus of claim 3, wherein the controlling device is a bearing shaft of a motor in an automatic sewing machine or a printing device.

8. The optical sensor apparatus of claim 3, wherein a minimum diameter of the thread is defined by an image resolution of the optical sensor apparatus.

9. A method of an optical sensor apparatus which is to be used with a controlling device arranged for controlling an object having along shape and flexible form of a material, comprising:
   using a light emitting circuit to generate and output a light ray to a surface of a portion of the object;
   sensing the light ray reflected from the surface for multiple times to generate multiple images;
   detecting at least one motion image in the generated multiple images; and
   determining a motion, an offset, or a rotation angle of the object, which is controlled by the thread controlling device, according to the detected at least one motion image;
   wherein the object has an end physically connected to at least one of a sensing device and an instrument device used for surgery, and a motion, an offset, or a rotation angle of the at least one of the sensing device and the instrument device used for surgery is determined based on the motion, the offset, or the rotation angle of the object.

10. The method of claim 9, wherein the material is a medical grade material, and the object is a thread, a wire, a tube, or a catheter made from the medical grade material.

11. The method of claim 9, wherein the object is a thread.

12. The method of claim 11, wherein the thread has a first round cross-section with a first radius, and the method further comprises:
   controlling another thread having a flexible form of another material, to determining a motion, an offset, or a rotation angle of the another thread which has a second round cross-section with a second radius different from the first radius.

13. The method of claim 11, further comprising:
   outputting the determined motion, the offset, or the rotation angle of the thread to the controlling device to make the controlling device control the thread with a fine adjustment based on the determined motion, the offset, or the rotation angle.

14. The method of claim 11, further comprising:
   receiving an indication signal generated from the thread controlling device wherein the indication signal indicates an adjustment of the motion, the offset, or the rotation angle of the thread; and
   generating a response signal to the controlling device to make the controlling device stop controlling the thread when a motion, a offset, or a rotation angle indicated by the detected at least one motion image matches the adjustment indicated by the indication signal.

15. The method of claim 11, wherein a minimum diameter of the thread is defined by an image resolution of the optical sensor apparatus.

* * * * *